US006757889B1

(12) United States Patent
Ito

(10) Patent No.: US 6,757,889 B1
(45) Date of Patent: Jun. 29, 2004

(54) SOURCE PROGRAM CHECKING DEVICE AND PROGRAM AND METHOD FOR SAME

(75) Inventor: Masako Ito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/471,180

(22) Filed: Dec. 23, 1999

(30) Foreign Application Priority Data

Jun. 9, 1999 (JP) ........................................... 11-161788

(51) Int. Cl.[7] ................................................ G06F 9/44

(52) U.S. Cl. ....................... 717/112; 717/113; 717/125; 717/126; 715/516; 715/529

(58) Field of Search ................................ 717/141–143, 717/110–113, 124–128; 715/514–516, 528–529

(56) References Cited

U.S. PATENT DOCUMENTS 6,115,544 A * 9/2000 Mueller ....................... 714/57
6,353,924 B1 * 3/2002 Ayers et al. ................ 717/128
6,418,543 B1 * 7/2002 Goli et al. .................... 714/38

FOREIGN PATENT DOCUMENTS

JP 63-188242 8/1988

* cited by examiner

*Primary Examiner*—Tuan Dam
*Assistant Examiner*—Ted T. Vo
(74) *Attorney, Agent, or Firm*—Staas & Halsey, LLP

(57) ABSTRACT

A group setting section divides indicated messages according to types upon receiving an instruction from the user and sets a default display status for the messages by group. An indicated message preparing section prepares an indicated message based on the check result by a checking section. An indicated message urgency processing section determines the urgency of the indicated message based on the number of revisions made in response to previous indicated messages of the same type. An output message editing section selects the indicated message to be output according to the group setting and the urgency, determines the order of output based on the urgency, and edits an output message. An outputting section outputs an indicated message list according to results of the editing.

19 Claims, 14 Drawing Sheets

USER GROUPS MESSAGES AND SETS DISPLAY/HIDDEN DISPLAY

| GROUP A | MSG1, MSG2, MSG3 | DISPLAY |
|---|---|---|
| GROUP B | MSG4, MSG5 | HIDDEN DISPLAY |

SOURCE FILE (PO. c) 2

SOURCE PROGRAM CHECKING DEVICE 1

4 INDICATED MESSAGE LIST

| SOURCE FILE NAME | LINE NUMBER | | INDICATED MESSAGE |
|---|---|---|---|
| PO. c | 87 | MSG1 | INTEGER OXffff" AND "s" NEVER EQUAL. PLEASE CONVERT "s" TO UNSIGNED SHORT. |
| PO. c | 151 | MSG1 | INTEGER OXffe0" AND "k" NEVER EQUAL. PLEASE CONVERT "k" TO UNSIGNED SHORT. |
| PO. c | 18 | MSG2 | NO VALUE SET FOR VARIABLE "u" BEFORE REFERENCE. |
| PO. c | 52 | MSG2 | NO VALUE SET FOR VARIABLE "a" BEFORE REFERENCE. |
| PO. c | 74 | MSG2 | NO VALUE SET FOR VARIABLE "x" BEFORE REFERENCE. |
| PO. c | 101 | MSG2 | NO VALUE SET FOR VARIABLE "n" BEFORE REFERENCE. |
| PO. c | 204 | MSG2 | NO VALUE SET FOR VARIABLE "ul" BEFORE REFERENCE. |
| PO. c | 191 | MSG3 | AT ANSI C CAST-TYPE "(int)c" CANNOT BE UPDATED. |

INDICATED MESSAGE HISTORY MEMORY SECTION 15

TABLE OF NUMBER OF PREVIOUS MESSAGES 151

SOURCE FILE: PO.c

| TYPE | MSG1 | MSG2 | MSG3 |
|---|---|---|---|
| NUMBER OF MESSAGES | 2 | 5 | 1 |

TABLE OF NUMBER OF ACCUMULATED MESSAGE REVISIONS 152

| TYPE | MSG1 | MSG2 | MSG3 | MSG4 | MSG5 |
|---|---|---|---|---|---|
| NUMBER OF MESSAGES | 0 | 0 | 0 | 0 | 0 |

| SOURCE FILE NAME | LINE NUMBER | INDICATED MESSAGE | |
|---|---|---|---|
| PO.c | 74 | MSG2 | NO VALUE SET FOR VARIABLE "x" BEFORE REFERENCE. |
| PO.c | 204 | MSG2 | NO VALUE SET FOR VARIABLE "ul" BEFORE REFERENCE. |
| PO.c | 87 | MSG1 | INTEGER "OXffff" AND "s" NEVER EQUAL. PLEASE CONVERT "s" TO UNSIGNED SHORT. |
| PO.c | 191 | MSG3 | AT ANSI C, CAST-TYPE "(INT) C" CANNOT BE UPDATED. |

C SOURCE PROGRAM

```
LINE:
50    INT SUM:
51    ISSY (CHAR *C) {
52    IF (SYMC (*C) )
53    SUM++:
54    }
```

NAME TABLE

| | | | |
|---|---|---|---|
| __SUM | DECLARATION: MAIN.C | LINE 50 REFERENCE: MAIN.C | LINE 53 |
| __ISSY | DEFINITION: MAIN.C | LINE 51 REFERENCE: ASM.S | LINE 99 |
| __SYMC | DEFINITION: ASM.S | LINE 60 REFERENCE: MAIN.C | LINE 52 |
| C | DECLARATION: MAIN.C | LINE 51 REFERENCE: MAIN.C | LINE 52 |

| GROUP | MEANING | DEFAULT |
|---|---|---|
| A | INDICATES HIGH PROBABILITY OF PROGRAM ERROR. APPLICABLE TO ALL PROGRAMS. | DISPLAY |
| B | DESCRIPTION MAY PREVENT MAINTAINABILITY, OR THE DESCRIPTION MAY LEAD TO DIFFERENT INTERPRETATION BY COMPILER. INDICATES THAT WHEN NEWLY PREPARED, MAINTAINABILITY OF THE PROGRAM SHOULD BE CONSIDERED, OR CHANGE OF COMPILER TYPE FOR THE PROGRAM SHOULD BE CONSIDERED. | HIDDEN DISPLAY |
| C | APPLICATION SHOULD PRIORITIZE PERFORMANCE AND CODE SIZE EFFICIENCY TO MAINTAINABILITY. SINCE THIS IMPLIES THAT REVISION MAY DETERIORATE MAINTAINABILITY, GOOD CONSIDERATION IS NEEDED FOR APPLICATION. | HIDDEN DISPLAY |
| D | A MINOR MATTER. IN MANY CASES THIS MAY NOT CONSTITUTE AN ERROR. | HIDDEN DISPLAY |
| E | DESCRIPTION RELATES TO Y2K ISSUE. CAREFUL CONSIDERATION IS NEEDED FOR APPLICATION. | HIDDEN DISPLAY |
| F | DESCRIPTION RELATES TO BREACH OF AN EMBEDDED C++ CONVENTION (LANGUAGE SPECIFICATION FOR EMBEDDED CODE). CAREFUL CONSIDERATION IS NEEDED FOR APPLICATION. | HIDDEN DISPLAY |

FIG. 6

SOURCE PROGRAM CHECKING DEVICE AND PROGRAM AND METHOD FOR SAME

CROSS-REFERENCE TO RELATED APPLICATION

This application claims the benefit of Japanese Patent Application No. 99-01434, which was filed in the Japanese Patent Office on Jun. 9, 1999, and which is incorporated herein by reference.

BACKGROUND OF THE INVENTION

1. Field of the Invention

The present invention pertains to devices, methods, and software programs for checking source programs. More particularly, the present invention relates to source program checking in which a user is allowed to output an indicated message in a required order.

2. Description of the Related Art

Programs to be executed by a computer are generally written in the C programming language and other computer languages. Such a source program is translated by a compiler, and an object program is prepared comprising a command list in machine language. At this stage the compiler checks the syntax of the source program which was input and outputs an error information list, if any syntax errors are detected.

The range of possible errors in a source program, however, is not limited to syntax errors detectable by a compiler. For example, even if the source program is syntactically correct, it may cause a logical conflict in a process, which in turn may impair the performance of the system. Generally, numerous errors may exist which the compiler may be unable to detect.

For this reason, a source program checking device has been proposed which can output indications of errors and caution situations in the source program. The proposed device also provided a message suggesting how to revise the source program to avoid those errors and caution situations. Such a device was disclosed in Japanese Published Application No. JP8-69380, entitled "Source Program Checking Device."

The disclosed source program checking device has an inputting means that inputs a source program and an analytical means that pattern check items and analyzes the source program. The device also has an outputting means that receives the analyzed result from the analytical means and outputs the extracted result as an indicated message. Such a device therefore enables a unified review of a programming task to check for contradictory sections in code prepared in a previous task. Moreover, such a device also enables checking for any problems such as performance, logic, and setting of variables/reference relationships (undefined or unused).

Conventionally, such a source program checking device has been able to output appropriate messages in a check result according to line numbers of the source program. Alternatively, the device could output the messages in a predetermined order according to types of messages.

Such a source program checking device would output a great number of indicated messages from a check result. This large volume of messages made it difficult for a user to quickly search for and identify all of the messages requiring immediate attention and correction.

The conventional source program checking device that output indicated messages in order of line numbers was unable to meet the requirements of users who needed to search quickly for all messages requiring urgent attention. This deficiency stemmed from the fact that the order of the line numbers has nothing to do with the degree of urgency of the generated messages. Devices that generated message output in a predetermined order by type of message were unable to provide a clear indication of which messages were more urgent. Thus, output of messages according to message type has also failed to meet users' requirements.

SUMMARY OF THE INVENTION

The present invention resolves the problems noted above by providing output of program-checking messages in order of urgency. It is an object of this invention to facilitate a quick search of all messages requiring urgent revision by the user.

In a first aspect, the present invention provides a device for checking a source program according to prescribed check items and outputting a check result from which an indicated message is generated. Such a device comprises means for grouping the indicated message into a group corresponding to a type of the indicated message, and means for editing the indicated message for output based on the group.

The source program checking device of this aspect thus checks prescribed check items upon analyzing a source program and outputs a check result as an indicated message. The device groups indicated messages by type and edits the indicated messages to be output based on the set grouping.

The means to edit the indicated message to be output may be constituted to determine whether to "output" or to "not output" the indicated message based on the group so set. The editing means may also determine the outputting order of the indicated message based on the set grouping.

In a second aspect, the present invention provides a device for checking a source program according to prescribed check items and outputting a check result from which an indicated message is generated. Such a device comprises means for determining an urgency of the indicated message and means for determining a relative order for output of the indicated message based on the urgency.

Thus, the second aspect of the invention provides a source program checking device that checks prescribed check items upon analyzing the source program and outputs an indicated message conveying a check result. The means to determine the urgency of the indicated message as a check result may be constituted to determine the urgency based on historical information by type of the indicated message.

A program to implement the above individual processing means by a computer can be encoded on a suitable recording medium, such as a portable storage medium, a semiconductor memory, a hard disk, and so forth, which is readable by the computer.

The present invention operates in the following manner. Whether a certain message must be urgently resolved depends on the individual, the use environment, and the subject matter of development. For this reason, it is advantageous to allow the user of the source program checking device to freely group messages by a group setting means. The user can thereby select and indicate only the messages of a certain group. In this manner, the user can selectively review only the messages the user deems urgent.

Moreover, messages to which the user has most often responded with revisions are defined as messages of high urgency. When the source program is checked and compared with the previous messages, the numbers of revisions are determined according to type of message and added to accumulated numbers of revisions by message type. If messages are output in descending order of the number of revisions of accumulated messages, the result is an output of indicated messages in order of urgency. The more often the source program checking device is used, the more accurate the determination of degree of urgency becomes.

In an alternative aspect, the present invention further provides a device, comprising a storage storing an indicated message corresponding to a result of checking a source program according to prescribed check items. Such a device also comprises a processor grouping the indicated message based on a type thereof and determining an output status of the indicated message based on the grouping thereof.

In a further alternative aspect, the present invention provides a device, comprising a storage storing an indicated message corresponding to a result of checking a source program according to prescribed check items. Such a device also comprises a processor determining an urgency of the indicated message based on a type thereof and determining a relative order for output of the indicated message based on the urgency.

BRIEF DESCRIPTION OF THE DRAWINGS

These and other objects and advantages of the invention will become apparent and more readily appreciated from the following description of the preferred embodiments, taken in conjunction with the accompanying drawings wherein like reference numerals indicate like elements throughout. In the drawings:

FIG. 5A shows a program to be input as a subject source program for checking;

FIG. 5B shows formed syntax text;

FIG. 5C shows a name table;

FIG. 6 illustrates an example of grouping and default;

DETAILED DESCRIPTION OF THE PREFERRED EMBODIMENTS

Reference will now be made in detail to particularly preferred embodiments of the present invention, examples of which are illustrated in the various views of the accompanying drawings.

Figure 1:
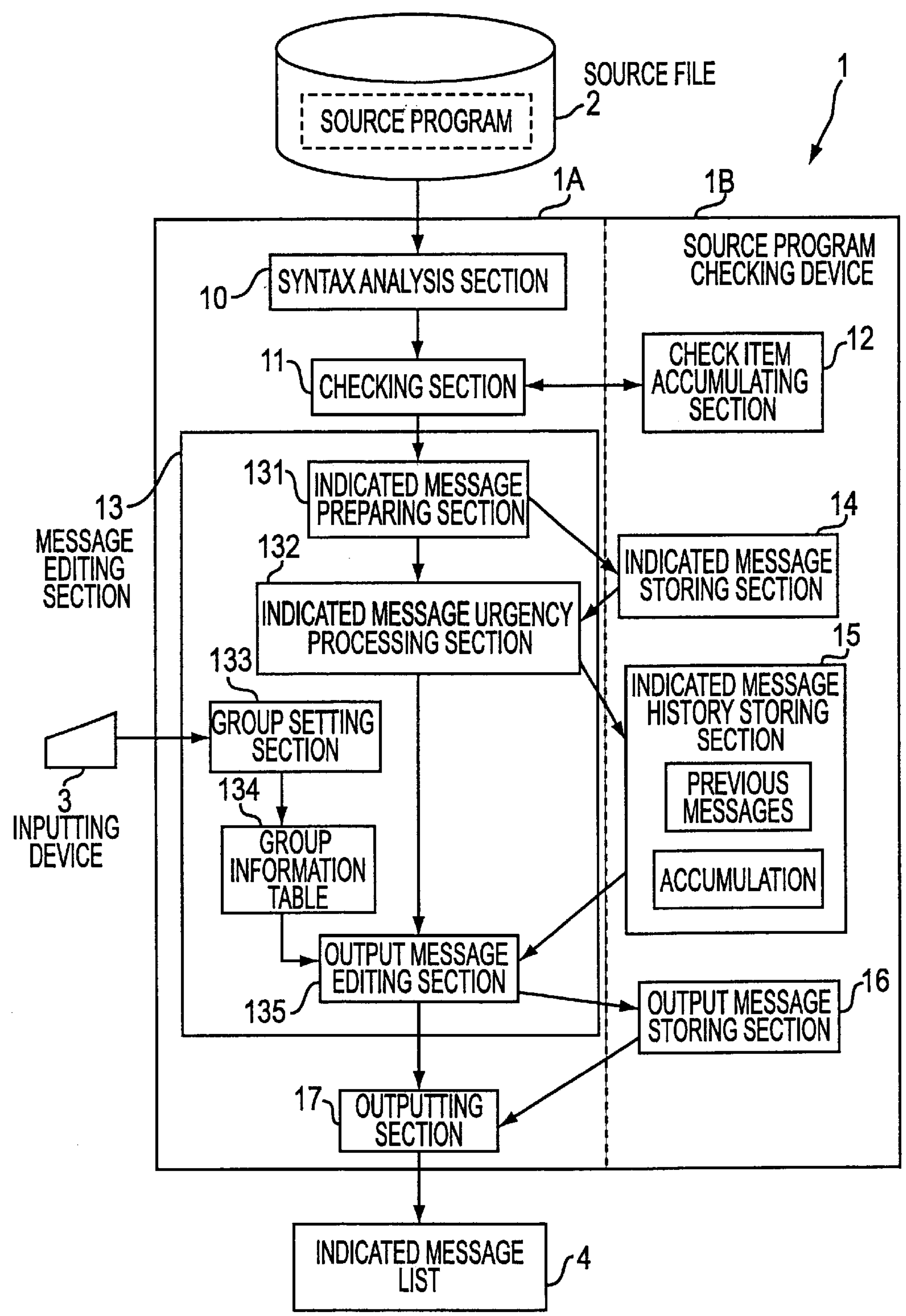
FIG. 1 is a block diagram illustrating an embodiment of the present invention.

FIG. 1 is a block diagram illustrating an embodiment of the present invention. A source program checking device 1 is a device comprising a CPU 1A and a memory 1B. Device 1 inputs a source program from a source file 2. The source program may be written in a programming language such as C, C++, and so forth. Device 1 generates an indicated message (for which revision or caution is required) based on a check result of the source program and outputs an indicated message list 4.

A syntax analysis section 10 analyzes the input source program and prepares a syntax text and a name table to be used in the checking process. A checking section 11 refers to the syntax text and the name table and checks prescribed check items accumulated in a check item accumulation section 12.

A message editing section 13 generates an indicated message from the check result and edits the message output based on the grouping or urgency of the indicated message.

An indicated message preparation section 131 of the message editing section 13 receives the result of the checking section 11 and prepares the indicated message. An indicated message urgency processing section 132 compares the numbers of previous messages by type with the numbers of messages by type in the current checking session. The numbers of previous messages are stored at the indicated message history recording section 15, to be described below. Processing Section 132 accumulates a history of the comparison results and determines from the accumulated results the types of messages in response to which the previous source programs have been most often revised. The higher the number of determined revisions by type, the higher the degree of urgency becomes.

A group setting section 133 groups together the messages according to their different types. Message numbers corresponding to the individual groups, as found in a group information table 134, are enclosed. An output status ("output" or "do not output") is set by group in the group information table 134 upon receiving an instruction input by the user. In addition to setting the output status ("output" or "do not output"), an output order by group may also be set.

An output message editing section 135 selects indicated messages to be output based on the process results from the group information table 134 and the urgent indicated message editing section 132. Editing section 135 also determines an output order for the indicated messages and then edits the output information.

An indicated message memory section 14 stores the type of the indicated message and the message content together as a pair corresponding to the check result. This operation is performed for all the steps of the source program. The possible indicated messages may include, for example, a performance improvement message, a portability message, a logical error message, and so forth. The indicated messages are based on the check result from the checking section 11.

An indicated message memory 15 stores and retains the numbers of previous messages according to indicated message type. Memory 15 also stores and retains an accumulated value of revisions made in response to the individual messages.

An output message memory section 16 stores an indicated message list 4, which is a list of output messages edited by the output message editing section 135. An outputting section 17 outputs information stored in the output message memory 16 to either a printer or a display device. The indicated message list 4 thereby output comprises indicated items such as, for example, a file name, a line number, a message, and so forth.

Examples of the operation of various embodiments of the present invention will now be explained with reference to FIGS. 2 and 3. For purposes of the following examples only, and without any limitation of the invention thereby, it will be assumed that there are five types of indicated messages, namely, msg1, msg2, msg3, msg4 and msg5.

In the first example, it will be further assumed that the user divides the types of messages into two types: groups a & b. Message types msg1, msg2 and msg3 are designated as the group a, while types msg4 and msg5 are designated as the group b. Also, it will be assumed that the group a is to be displayed while the group b is not displayed. All such information is included in the group information table 134 by the group setting section 133.

In the illustrated example, source program is input from a source file 2 under the file name "PO.c". The syntax analysis section 10 analyzes the source program for syntax and prepares a syntax text and a name table. The checking section 11 checks prescribed check items. The indicated message preparation section 131 generates an indicated message based on the check result.

The output message editing section 135 extracts and edits only the indicated messages of the designated group (types msg1, msg2 and msg3 of the group a, which has been designated for display) out of the entirety of the indicated messages prepared by the indicated message preparation section 131. Editing section 135 then outputs the extracted and edited messages as the indicated message list 4. Here, for purposes of the present example only, it will be assumed that the output urgency of the types of indicated messages is initialized at the outset in the order of msg1, msg2 and msg3. As shown in FIG. 2, two line numbers 87 and 151 have been listed with indicated messages of type msg1. Five line numbers 18, 52, 74, 101 and 204 have indicated messages of type msg2. Only one line number, line 19, has been listed with an indicated message of type msg3. Messages of types msg4 and msg5 are not included in the indicated message list 4 as output here, because the group b has been designated as "hidden display."

The numbers of messages of types msg1, msg2 and msg3 (i.e., the number of each type in the designated group a) is determined and stored, by type, in a table of previous message numbers 151 of the indicated message history memory section 15. In this example, the number of messages of type msg1 is 2, the number messages of type msg2 is 5, and the number of type msg3 is 1. An accumulated message revision number table 152 records the number of revisions corresponding to each type of indicated message. Because table 152 in the illustrated example has not yet been updated, the initial value is 0 for all types. Proceeding with this example, it will now be assumed that the user has revised, for example, one of the two places identified with messages of type msg1, and three out of five places identified with messages of type msg2. The user carries out these revisions on the source file (PO.c)2 with reference to the indicated message list 4 of FIG. 2. This process is outlined in FIG. 3.

The process of analyzing the source file for syntax by the syntax analysis section 10 and conducting the prescribed checking in the checking section 11 is carried out again after the revision. Indicated messages are again generated by the indicated message preparation section 131.

The numbers of previous messages of various types, included in the previous message number table 151, are compared to the numbers of various types of messages for the current checking session (as stored in the memory) by the indicated message urgency processing section 132. The numbers of messages for which revisions were performed are determined and incorporated into the accumulated message revision number table 152.

Figure 2:
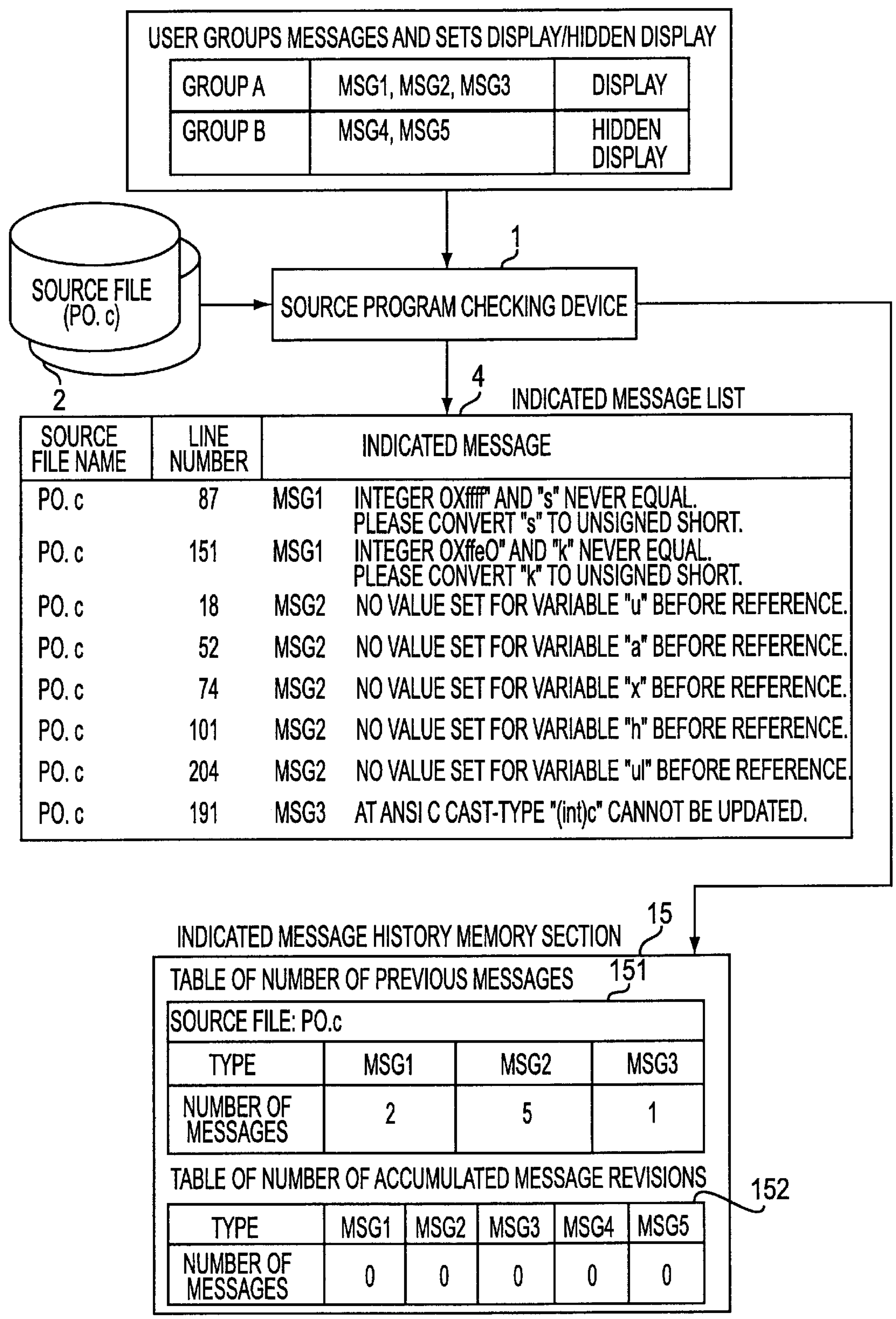
FIG. 2 shows an example (1) outlining the operation of the present invention.
Figure 3:
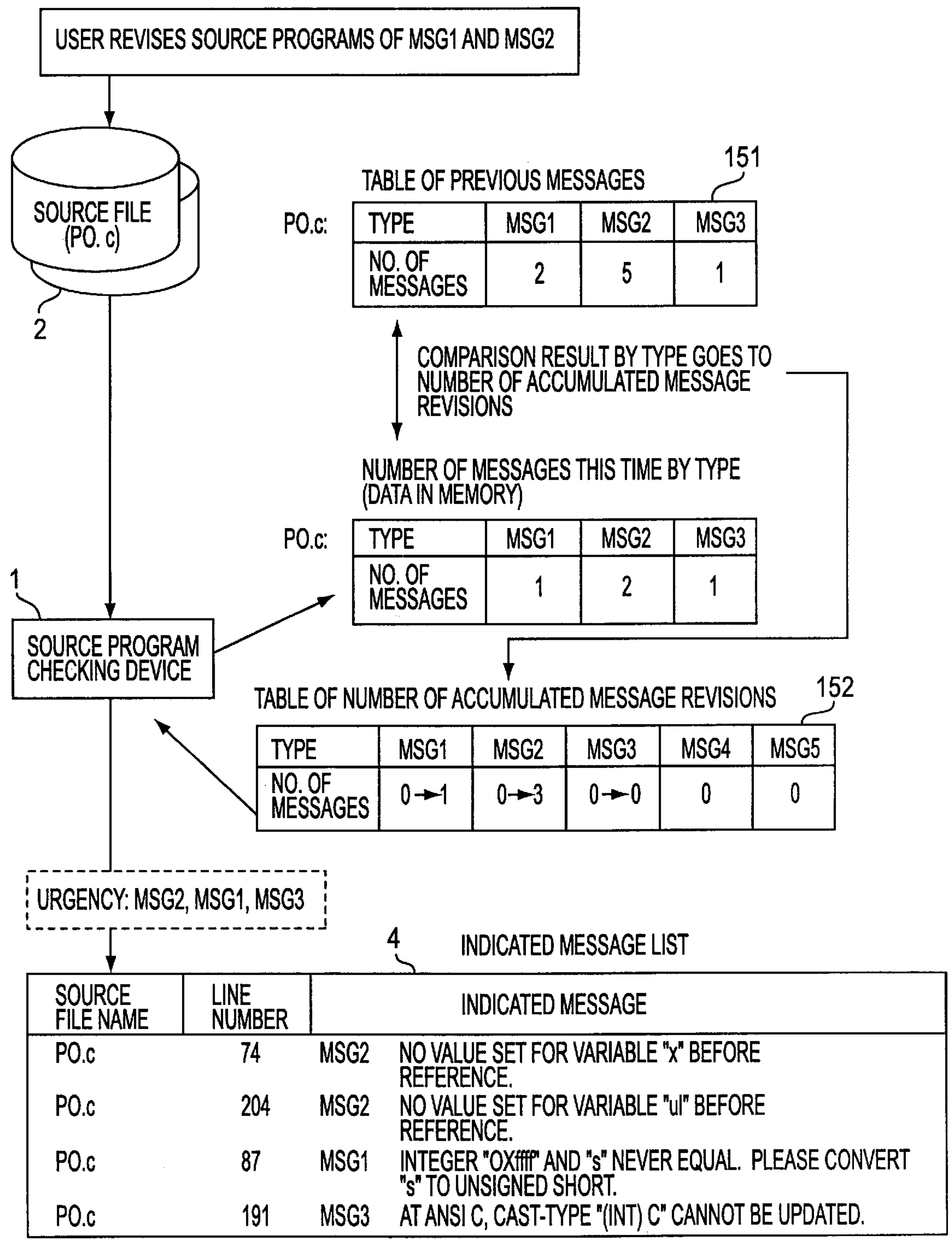
FIG. 3 shows an example (2) also outlining the operation of the present invention.

Returning to the example of FIGS. 2 and 3, the previous number of messages of type msg1 is 2, and the number for the current checking session is 1. Therefore, it is concluded that one revision was made. For type msg2, the previous message number is 5 and the message number is 2 for the current checking session. It is therefore concluded that 3 revisions were made in response to the type msg2 messages.

For messages of type msg3, the previous message number is 1 and the current message number is 1. It is therefore concluded that no revision corresponding to message type msg3 has been made. As noted above, a higher number of revisions is interpreted to mean that the indicated messages are more important for the user. By accumulating the numbers of revisions made according to the type of message, the urgency of indicated messages is determined by the accumulated values.

In the example of FIG. 3, the number of revisions corresponding to message type msg1 is changed from 0 to 1 in the accumulated message revision number table 152. The number of revisions for message type msg2 is similarly changed from 0 to 3. However, no revision has been made in response to a message of type msg3, and the number of revisions for msg3 accordingly remains as 0. In the accumulated message revision number table 152, the number of revisions of all types of messages is summed and accumulated without regard for the types of the source files.

When the above process is completed, the numbers of messages for the current checking session are stored by type in the message number table 151 for reference with respect to a next checking session. That is, 1 is set in the column for msg1, 2 is set in the column for msg2, and 1 is set in the column for msg3 in the previous message number table 151. A previous message number table 151 is maintained for each source file. If no revisions are made to a source file for a specified time period, the table 151 for that source file is automatically cleared. This policy is employed in the present embodiment of the invention because a source file which has not been revised for a long period of time can contain a different source program, even if the file name remains the same. In such a situation it is not reasonable to determine the degree of urgency based on comparison of the numbers of current messages to the corresponding numbers of previous messages.

As mentioned above, the larger the number of revisions that are made in response to a given type of message, the more urgent it is deemed that revisions for messages of that type should be made. Therefore, the indicated message urgent processing section 132 places the message types in descending order of number of revisions made. For example, the descending order might be msg2; msg1; msg3.

The output message editing section 135 edits a message list so that the messages will be output by type according to the descending order (msg2; msg1; msg3) indicating that the determined urgency. The outputting section 17 outputs the results as the indicated message list 4. For example, as shown in FIG. 3, two line numbers (74 and 204) are listed with indicated messages of type msg2. Similarly, one line number (87) has an indicated message of type msg1, and one line number (191) has an indicated message of type msg3.

Figure 4:
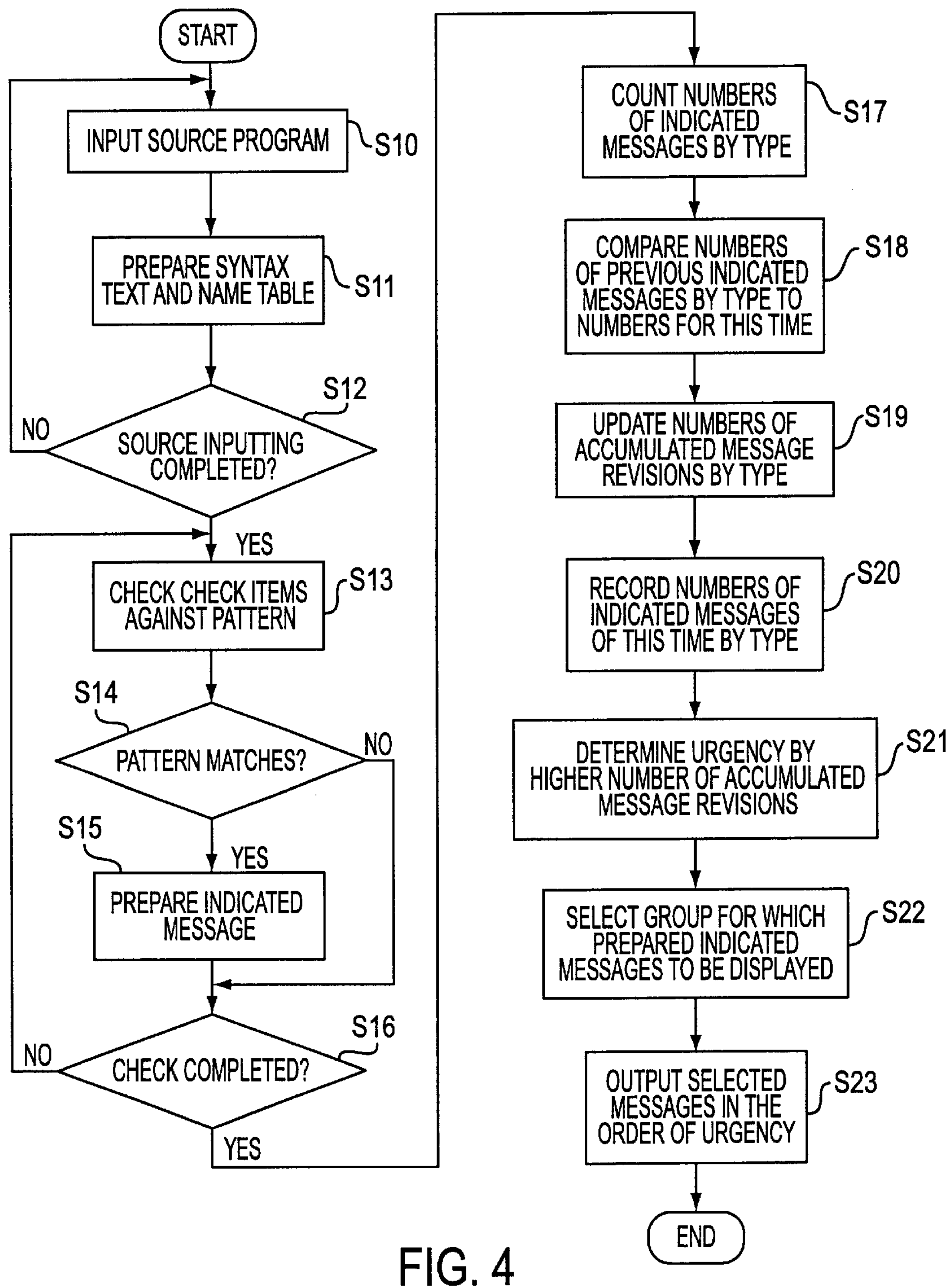
FIG. 4 is a flow chart illustrating an overall process for the embodiment of FIG. 1.

FIG. 4 is a flow chart showing an overall process outline for the present embodiment, except for the process of the group setting section 133. The process of the group setting section 133 will be described later.

The overall process begins with inputting a subject source program from a source file 2 (step S10). A syntax text and a name table are prepared by the syntax analysis section 10 (step S11). The process of steps S10 & S11 is repeated until the source inputting work is completed (step S12).

Next, an item of the syntax text is checked against a pattern by the checking section 11 (step S13), and it is determined whether the pattern matches (step S14). If a match is detected, then an indicated message is prepared corresponding to the pattern (step S15). Steps S13 through S15 are repeated for each item of the syntax text until all check items are checked against patterns (step S16).

The numbers of indicated messages are counted by type from the results of the checking operation by the message editing section 13 (step S17). The numbers of previous indicated messages are compared by type to the corresponding numbers of messages for the current checking session (step S18). For each message type, the difference between these numbers is taken to be the number of revisions for that message type. The table 152 is then updated with a new accumulated number of revisions by type of the corresponding messages (step S19).

Next, the numbers of indicated messages for the current checking session are recorded by type for comparison with respect to a next checking session (step S20). The urgencies of the message types are then determined according to the descending order of accumulated numbers of revisions corresponding to the message types (step S21). Those messages are selected that are of types included in the group of types designated for display (step S22). Thereafter, the selected messages are output in descending order of urgency by the outputting section 17 (step S23).

The system described in the aforementioned Japanese Published Application can be applied here at steps S10 through S16. An outline of such an application is now presented.

Figures 5A, 5B, 5C:
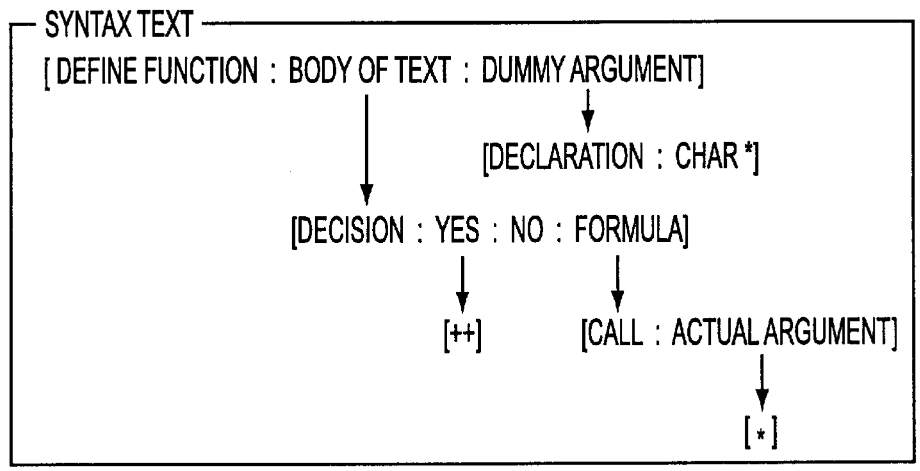
FIGS. 5A–5C illustrate the operation of the syntax analysis section.

FIGS. 5A–5C illustrate the operation of the syntax analysis section 10. FIG. 5A is an illustration of a program (written in the C programming language) to be input as a subject source program for checking. Line 51 of the source program of FIG. 5A is "issy (char *c)" and line 52 is a decision statement. Here, only the operation to be performed for a "yes" outcome is specified. The string "char *c" represents a dummy argument, and "c" represents a variable name.

Based on the source program as in FIG. 5A, the syntax analysis section 10 parses and accumulates statements part-by-part into categories to form a syntax text, as shown in FIG. 5B, and a name table, as shown in FIG. 5C. One syntax item of the syntax text is prepared for each processing unit (i.e., each programming language expression) of the input source program, and the syntax items are combined with one another to show the flow of processes. The name table is prepared based on the format of the syntax of the source program by dividing the syntax text into suitable categories of information such as variables, functions, and labels.

As is shown in FIG. 5B, when line 51 is read from the source program as shown in FIG. 5A, the syntax text is initialized as, and is verified in the same format as a control text. The name table of FIG. 5C defines the names used in the source program. For example, "sum" is defined by a declaration indicating that this expression is used in line 50 of the source program "main.c. "

The checking section 11 checks the syntax items of the parsed source program for potential problems by referring to check items held by the check item accumulating section 12. Checking is done as follows:

(1) Logical error checking: Check for and identify areas with high probability of logical errors, although no compilation errors have occurred.

(2) Performance improvement checking: Check for and identify areas where problems may occur during execution.

(3) Portability checking: Check for and identify areas where a problem may arise if the compiler is changed.

(4) Complexity checking: Check the complexity of the program structure according to a specified standard and display the degree of complexity.

(5) Undefined variable/function checking: Check for and identify variables, functions, and labels that have not been defined.

(6) Unused variable/function checking: Check for and identify variables, functions, and labels that have been defined but not used.

If a potential problem is indicated by a match for any of these check items, then an indicated message will be generated.

Next, the grouping of indicated messages will be described in detail. The group setting section 133 of the message editing section 13 divides the indicated messages into several optional groups according to an instruction input by the user. The indicated messages are thereby categorized as "display" or "hidden display." Based on such groupings, information is entered into the group information table 134 to indicate a corresponding relationship between a group and a message number, and information indicating the display category as "display" or "hidden display".

FIG. 6 illustrates a specific set of groups for indicated messages and a default display status for each group. For example, if the user does not set anything, individual messages are classified into groups a–f according to the context of the corresponding messages, as shown in FIG. 6. That is, the illustrated set of groups may be used as a default grouping for the system. Group a, for example, may be a group for which "indicated messages correspond to a high is probability of program error." Since group a is set for "display," indicated messages of this group will be displayed in the indicated message list 4. Since the other groups b–f are set for "hidden display," such messages will not be displayed in the indicated message list 4, even though indicated messages for those groups have been generated.

Figure 7:
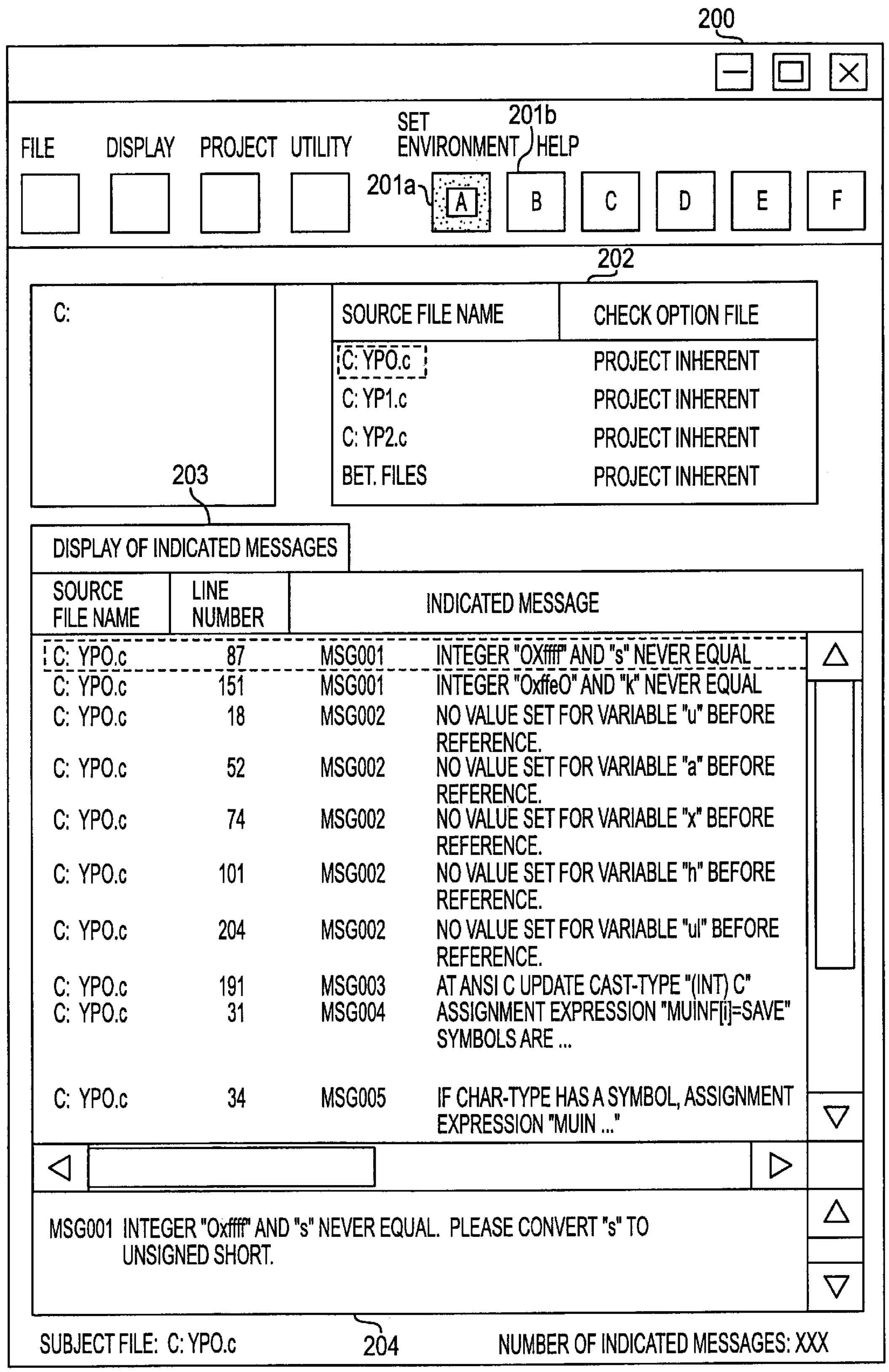
FIG. 7 illustrates an Indicated message list display screen (1)

FIG. 7 illustrates a display screen for displaying a list of indicated messages. Indicated message list display screen 200 includes group buttons 201*a*, 201*b*, and so forth. Using the group buttons 201, a group which the user wants to display may be selected or the current group on display may be shown. As illustrated, display screen 200 may also include a list of subject source files provided in a source file selection frame 202, by which the user can select a source file. An indicated message list frame 203 displays an indicated message list, and a selected message display frame 204 displays the content of an indicated message that has been selected.

In the screen shown in FIG. 7, a source file PO.c has been selected at the source file selection frame 202. Indicated messages of message types msg1, msg2, msg3, msg4 and msg5 are displayed as members of group a, which has been selected by default. Since the group a is set for "display," these indicated messages are displayed in the indicated message list frame 203. Furthermore, in the illustrated example, the content of the indicated message for line number 87 has been selected at the indicated message list frame 203 and is displayed in a selected message display frame 204. An indication of the currently selected group, which in this example is group a, is provided by displaying the selected group button 201*a* in a contrasting color.

If it is desired to redefine the indicated message groups, the user can select an "indicated message group setting" item from an appropriate menu on the display screen. This action will cause a dialog box to be displayed for a group setting screen, from which the desired change in the grouping of indicated messages can be carried out.

Figure 8:
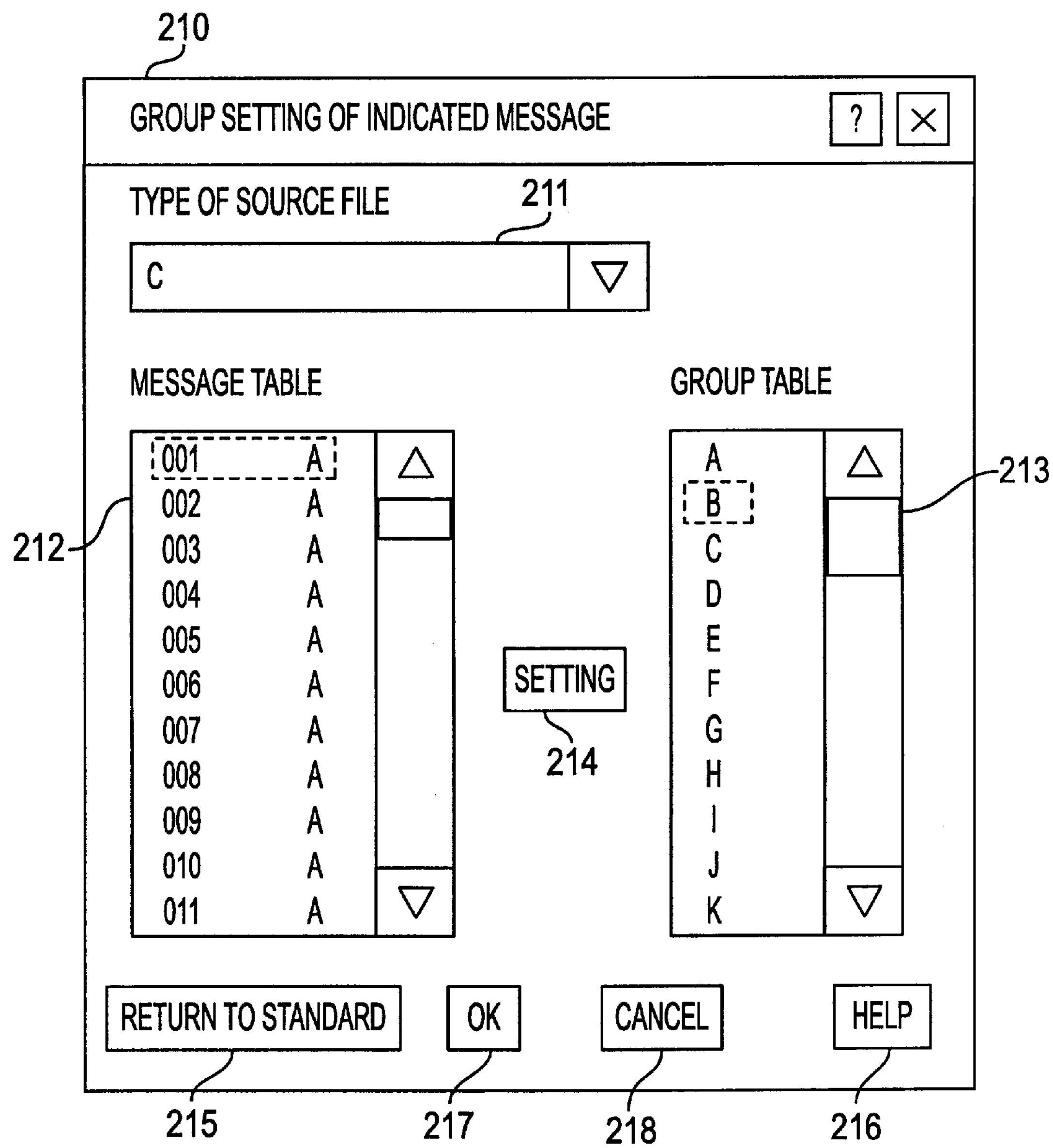
FIG. 8 illustrates a group setting screen.

FIG. 8 illustrates a group setting screen 210 that comprises a source file type selection frame 211 from which the user can select the source file type. Thus, the user can select the source file type according to whether the file is, for example, a C source file, a C++ source file, or an assembler source file. Also included is a message list frame 212, which displays the groups to which indicated message numbers are assigned.

A group list frame 213 displays a list of groups, and a "set" button 214 is provided for setting a group. A "return to standard" button 215 returns the group information to the default settings. A "help" button 216 displays a description of operational information. An "OK" button 217 defines the displayed selections as information to be set. A "cancel" button 218 returns the group information to the previous settings.

For example, assume that it is desired to change the indicated message msg001 from the current group a to the group b. The user can accomplish this change by selecting "001" from the message list frame 212 and "b" from the group list 213. The user then clicks the "set" button 214 and thereafter clicks the "OK" button 217 to complete the process.

Figure 9:
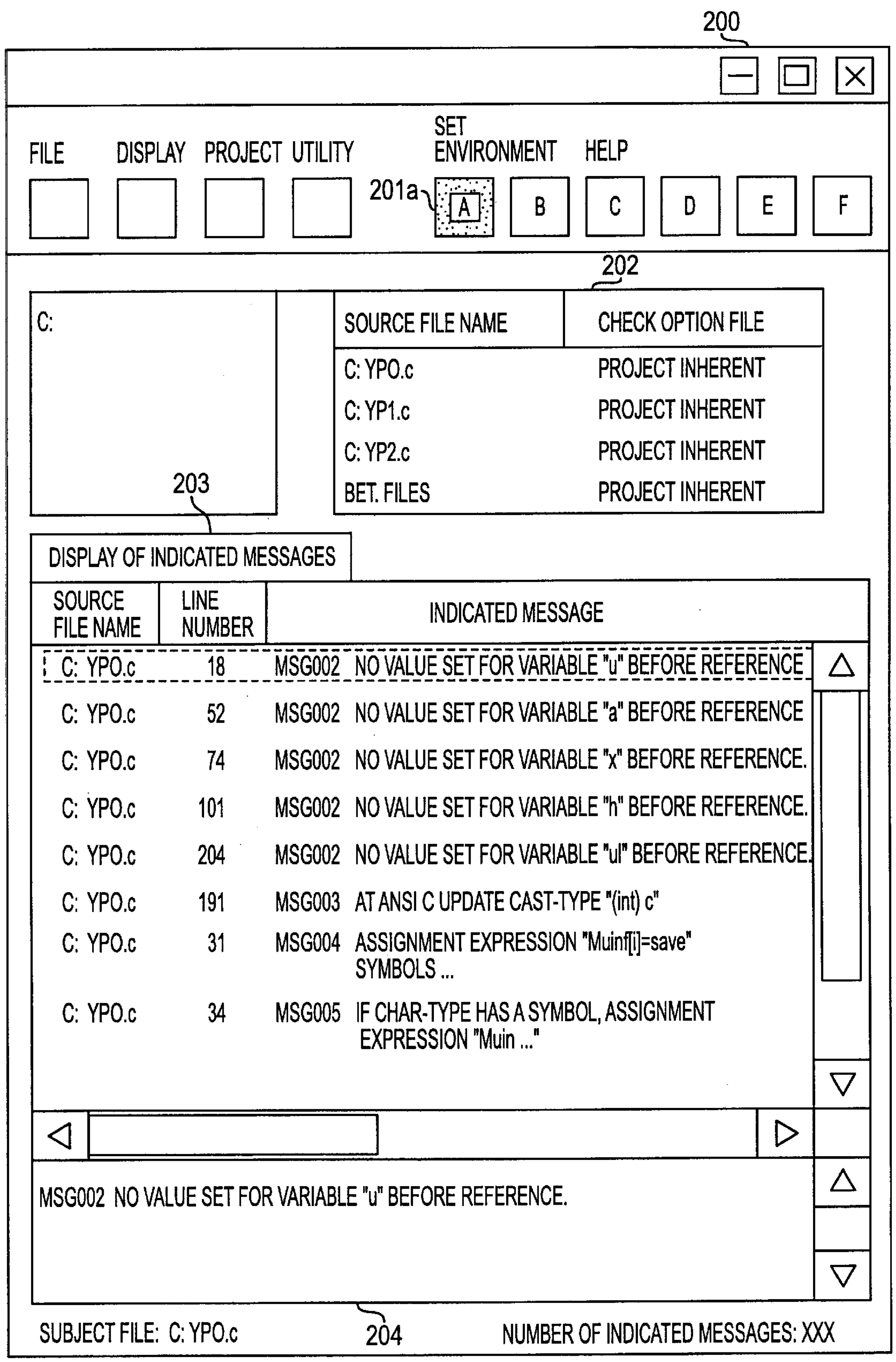
FIG. 9 illustrates an indicated message list display screen (2)

FIG. 9 illustrates the indicated message list display screen 200 after such a change of grouping. Because the indicated message msg001 was changed from the group a to the group b, the output message editing section 135 re-edits the message list to be output. Hence, the indicated message list frame 203 now displays the list of indicated messages as msg002, msg003, msg004 and msg005, which are included in the group a. The indicated message msg001 is not displayed, because this message now belongs to the group b on "hidden display."

It is noted that the present exemplary embodiment of the invention provides a choice of two procedures for changing the default settings for a group. The first procedure is to click the appropriate group button 201 on the tool bar of the indicated message list display screen 200. As will now be explained, the other procedure is to use a filter setting screen by selecting it in the main menu, as follows.

Figure 10:
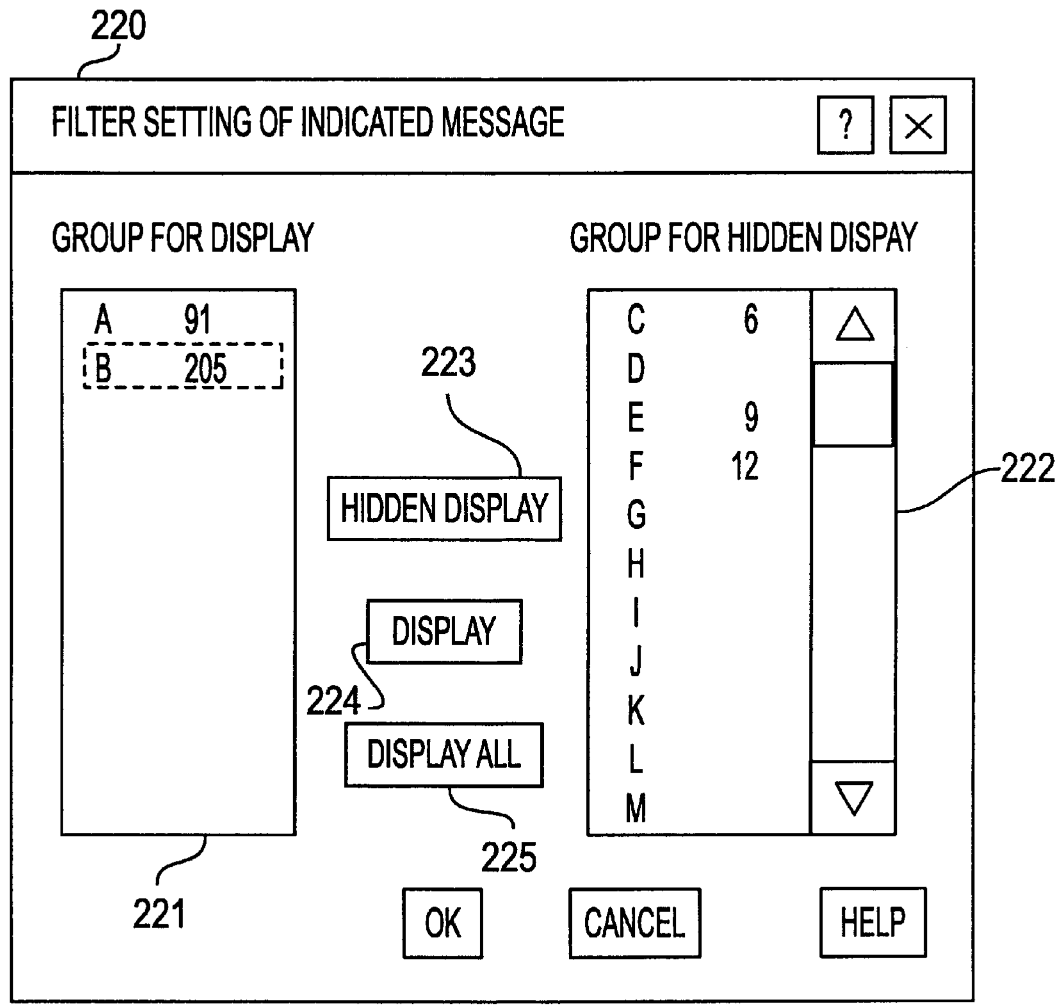
FIG. 10 illustrates a filter setting screen.

FIG. 10 illustrates a filter setting screen 220. An appropriate menu on the display screen 200 includes an item "indicated message filter setting." Selection of this item causes a dialog box for the filter setting screen 220 to be displayed, as shown in FIG. 10. The filter setting screen 220 includes a display group list frame 221 which displays a list of groups having the display status "display" and the number of messages in each group.

A hidden display group list frame 222 displays a list of groups having display status "hidden display" and the number of messages in each group. A "hidden display" button 223 displays a "hidden display" group that has been selected. A "display" button 224 displays a selected group, and a "display all" button 225 displays the indicated messages corresponding to all of the groups.

If it is desired to change all of the indicated messages of a group from "hidden display" status to "display" status, the user can select the group to be displayed from the group list frame 222. This activates the "hidden display" side of the filter setting screen 220, after which the user clicks the "display" button 224. If it is desired to change all of the indicated messages of a group from "display" to "hidden display," the user can select the group from the group list frame 221. This activates the display side of the filter setting screen 220, after which the user then clicks the "hidden display" button 223.

FIG. 10 illustrates the default state in which only the group a is assigned the "display" status. From this default state the group b is selected from the group list frame 222. This activates the "hidden display" side, and the user then clicks the "display" button 224 to set the group b into the "display" status. As illustrated, the display group list frame 221 displays both the group a with its corresponding number of messages and the group b with its corresponding number of messages.

Figure 11:
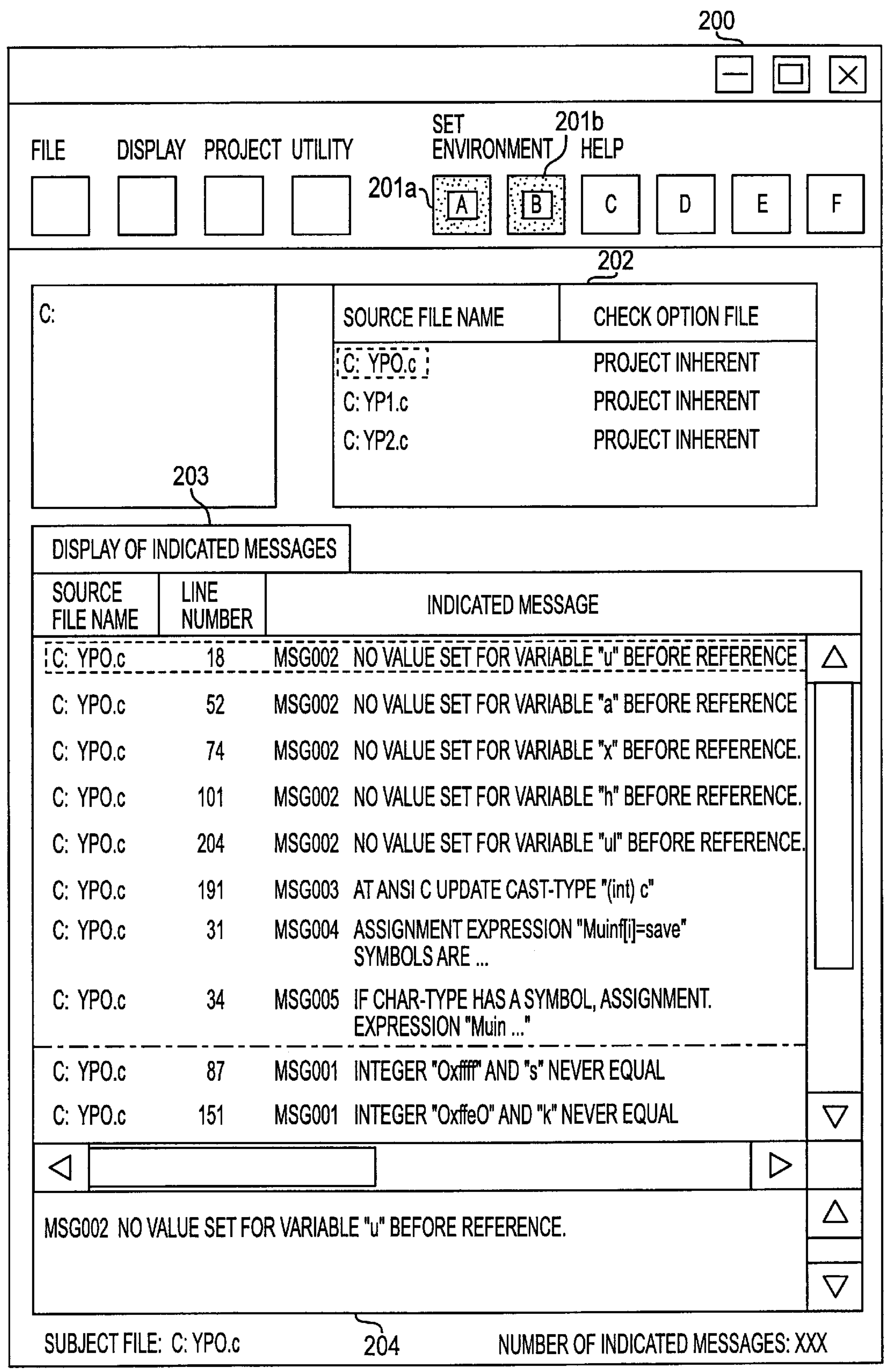
FIG. 11 illustrates an indicated message list display screen (3)

FIG. 11 illustrates the indicated message list display screen 200 when the groups a and b are set in the "display" status. Display colors for the group button 201*a* and the group button 201*b* are changed on the display screen 200. The indicated message list frame 203 displays a list of indicated messages msg002, msg003, msg004 and msg005 (of the group a) and the indicated message msg001 (of the group b).

In the indicated message list display screen 200 as shown in FIG. 9, the group b has been set to the "hidden display" status. However, if the group button 201*b* is directly pressed by a pointing device such as a mouse, the indicated messages of the group b can be displayed.

Figure 12:
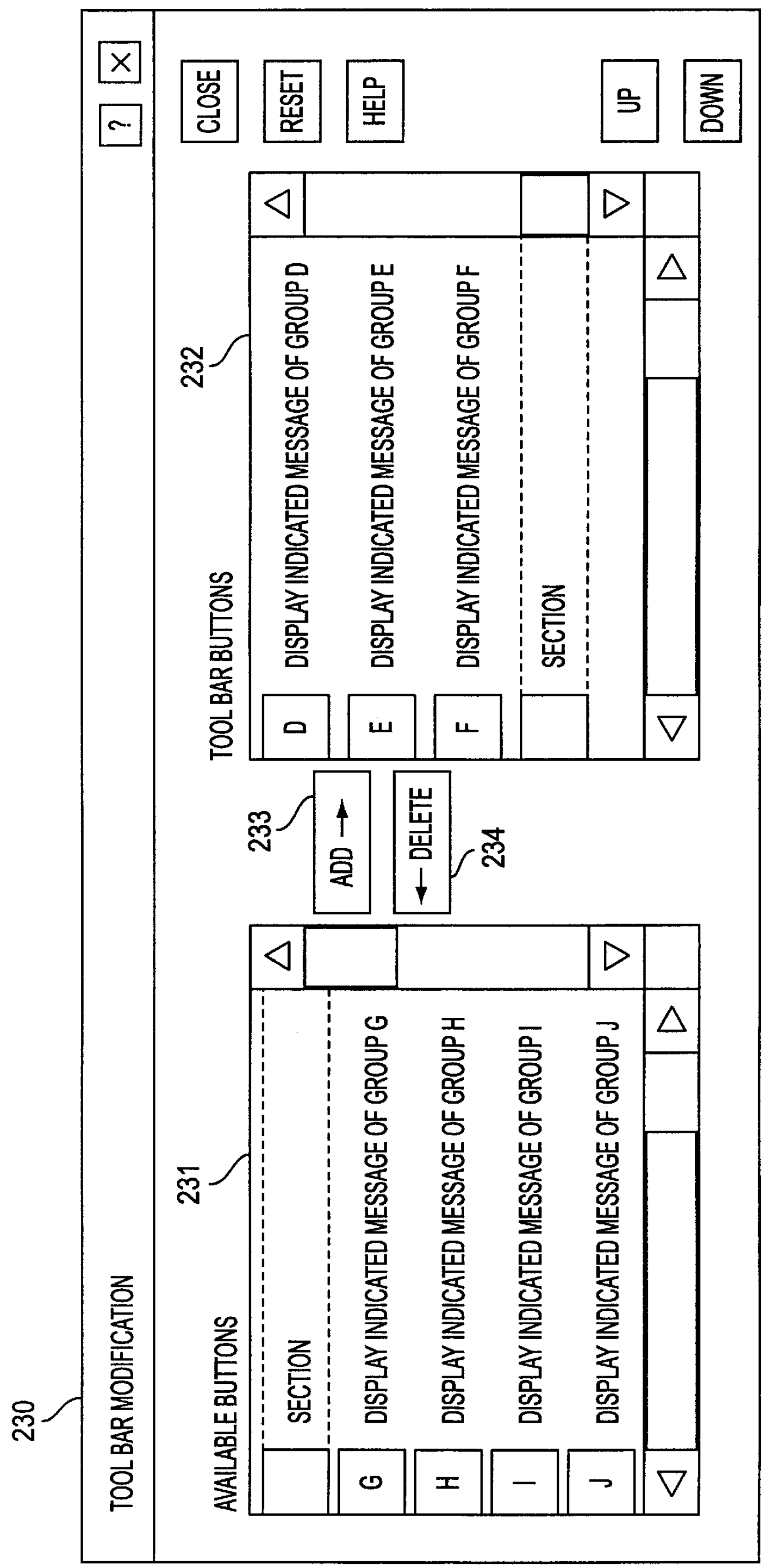
FIG. 12 illustrates a tool bar change screen.

If the user wants to add a group button for a new group, this can be done using a tool bar change screen. FIG. 12 illustrates such a tool bar change screen 230. For example, to add a group button for a new group z, the user can select an item "change tool bar" (not shown) in the "set environment" menu. This action will display the dialog box of the tool bar change screen 230, as shown in FIG. 12.

Figure 13:
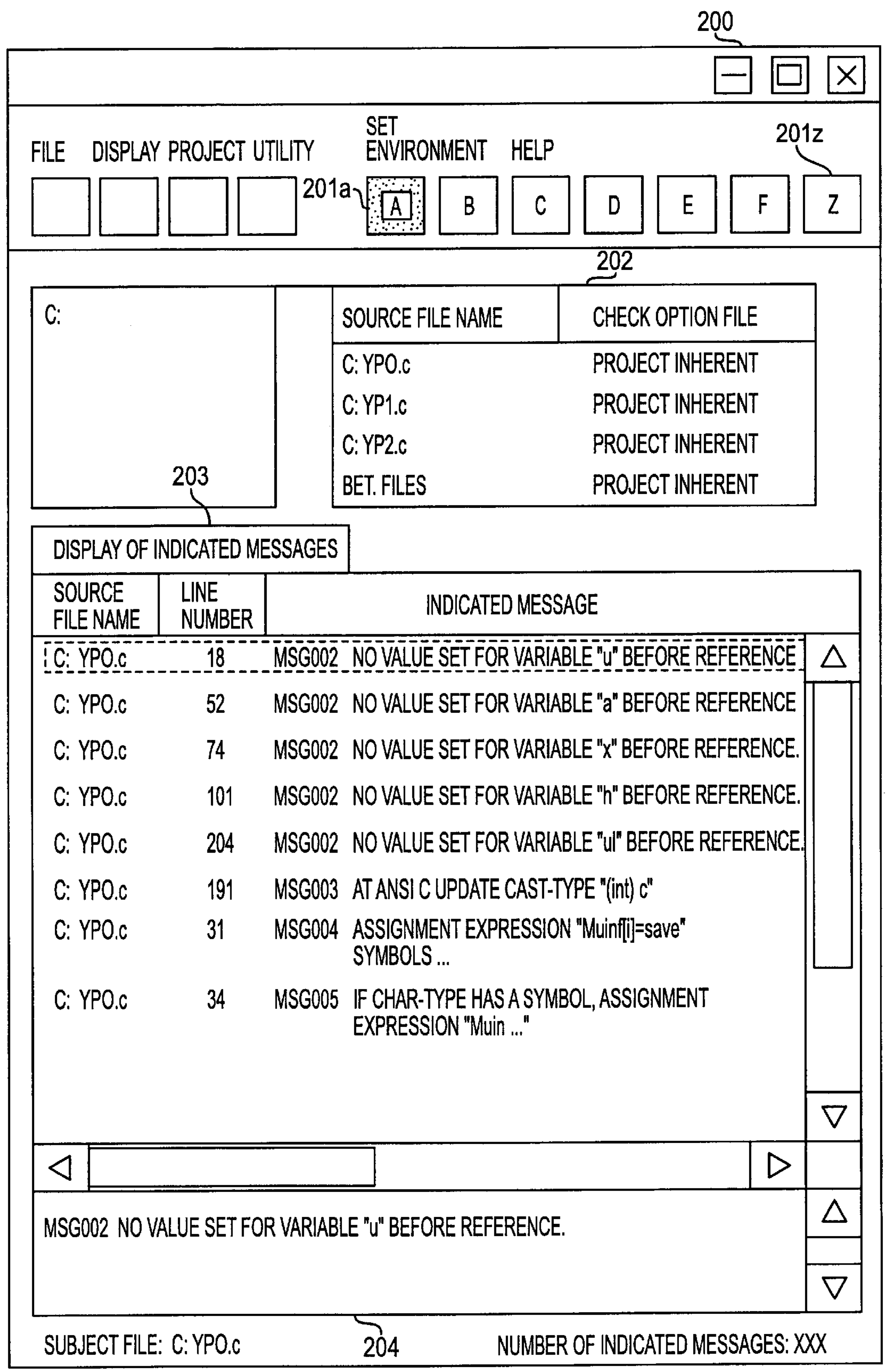
FIG. 13 illustrates an indicated message list display screen (4)

From the tool bar change screen 230, the user selects a "section" for the group button, from an available button list frame 231, and the clicks an "add" button 233. This procedure causes a new group button to be added to a tool bar button list frame 232. The added group button can then be set as "display indicated message of group z." FIG. 13 illustrates the indicated message list display screen 200 after performing this group button addition process. A new group button 201*z*, for the group z, is now displayed on the display screen 200.

It may be desired to delete a group button currently displayed on the indicated message list display screen 200. To do so, the user selects the displayed button from the button list frame 232 of the tool bar in the tool bar change screen 230, as shown in FIG. 12. The user then clicks a deletion button 234 to delete the selected button.

Figure 14:
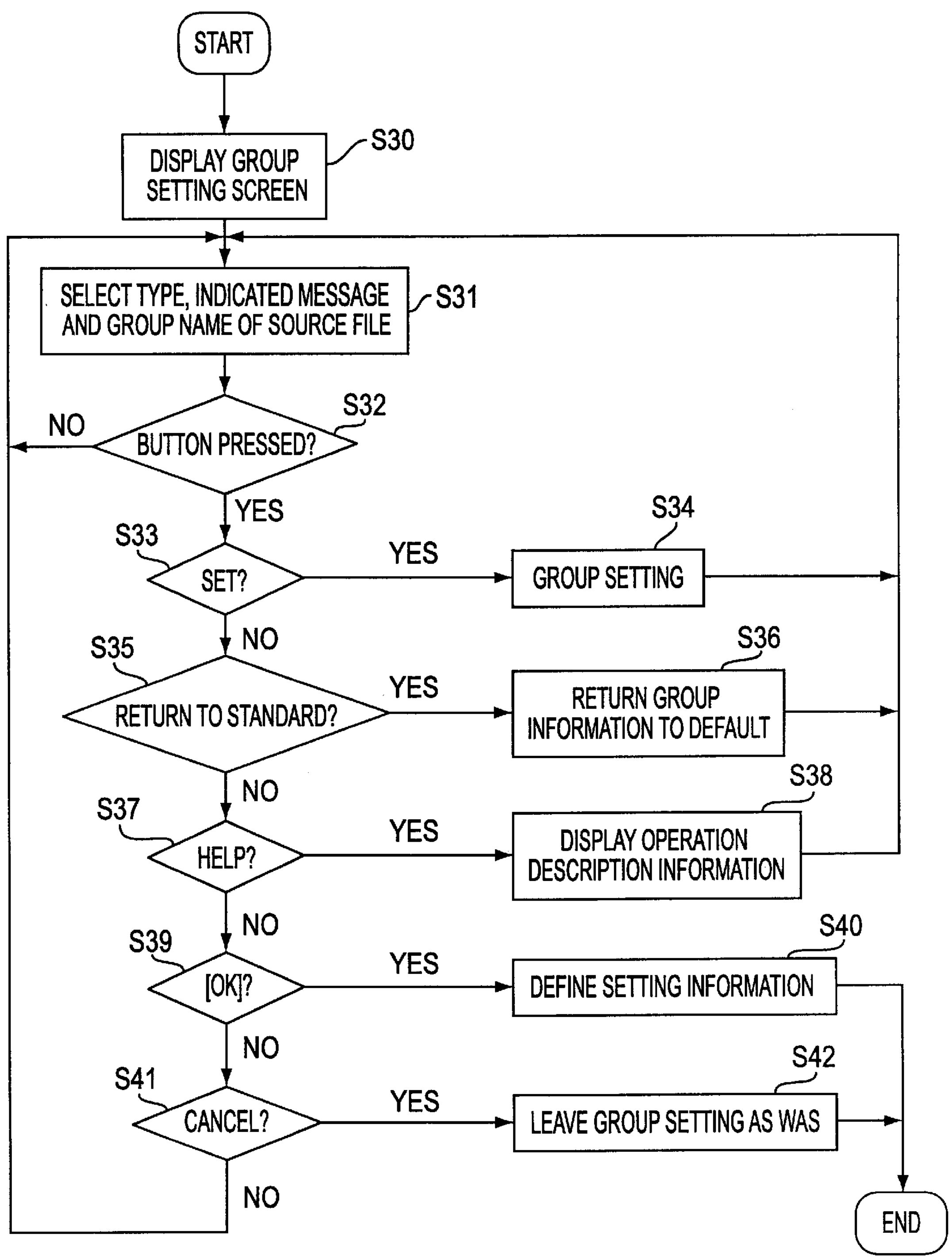
FIG. 14 is a flow chart for a process carried out by the group setting section.

FIG. 14 is a process flow chart illustrating operation of the group setting section 133. First, group setting section 133 displays the group setting screen 210 as shown in FIG. 8 (step S30). When a source file type, an indicated message, and a group name are selected (step S31), section 133 waits for the user to press a button (step S32). If a button is pressed, then the following process is performed according to the type of the button.

In the case of the "set" button 214 being pressed ("yes" at step S33), the group information table 134 for the indicated message and the group selected at step S31 are updated, and the group is set (step S34). If the "return to standard" button 215 is pressed ("yes" at step S35), then the group information is returned to the default settings (step S36). If the "help" button 216 is pressed ("yes" at step S37), then prescribed operational description information is displayed (step S38). If the "OK" button 217 is pressed ("yes" at step S39), then information that has been "set" is defined (step S40) and the process ends. If the "cancel" button 218 is pressed (step S41), then the group setting is left as it was (step S42) and the process ends.

As explained above, the present invention enables a source program to be analyzed and an indicated message generated from a check result, based on prescribed check items, to be output. The above-described embodiments also make it possible to set the output status ("output" or "do not output") by group, so that only the indicated messages desired by the user for output are displayed. The desired messages to be displayed can be selected out of a great number of indicated message groups, which provides the advantage of improving the checking efficiency of indicated messages.

Also, the present invention allows the urgency of indicated messages to be determined by message type, based on the number of revisions made in the past in response to indicated messages of those types. Further, it is possible to list and display indicated messages in descending order of urgency. The indicated messages of highest urgency can be displayed at the top of a list. In this way, the invention has the advantage of enabling all the messages for which revisions are necessary to be reliably identified from among numerous messages. The invention thereby enhances the efficiency of program development and helps to improve the quality of the resulting source programs.

Although a few preferred embodiments of the present invention have been shown and described, it will be appreciated by those skilled in the art that changes may be made to these embodiments without departing from the principles and spirit of the invention. Accordingly, the scope of the present invention is defined by the following claims and equivalents thereof.

What is claimed is:

1. A device for checking a source program according to prescribed check items and outputting a check result from which an indicated message is generated, said device comprising:

means for grouping the indicated message into a group corresponding to a meaning of the indicated message; and means for editing the indicated message for output based on the group, wherein the editing means outputs an error list comprising a list of messages, and where said editing means determines whether the indicated message is to be displayed when the error list is displayed based on the group containing the indicated message.

2. A device according to claim 1, wherein said editing means determines an order for outputting indicated messages to be output by said device.

3. A device for checking a source program according to prescribed check items and outputting a check result from which an indicated message is generated, said device comprising:

means for determining an urgency of the indicated message;

means for determining a relative order for output of the indicated message based on the urgency; and means for outputting an error list comprising a list of messages from the check result, and determining whether the indicated message is to be displayed with the error list based on information indicating which types of message meanings or groups thereof are to be displayed.

4. A device according to claim 3, wherein said urgency determining means determines the urgency based on historical information for previous indicated messages of a same meaning as the indicated message.

5. A computer-readable medium encoded with a checking program for checking a source program according to prescribed check items and outputting a check result from which an indicated message is generated, said checking program comprising program instructions for:

grouping the indicated message into a group corresponding to a meaning of the indicated message; and editing the indicated message for output based on the group, where the editing comprises outputting an error list comprising a list of messages from the check result, and where said editing determines whether the indicated message is to be displayed when the error list is displayed based on the group containing the indicated message.

6. A computer-readable medium encoded with a checking program for checking a source program according to prescribed check items and outputting a check result from which an indicated message is generated, said checking program comprising program instructions for:

determining an urgency of the indicated message based on the check result; determining a relative order for output of the indicated message based on the urgency; and when outputting an error list comprising a list of messages from the check result, determining whether the indicated message is to be displayed with the error list based on information indicating which types of message meanings or groups thereof are to be displayed.

7. A device, comprising:

a storage storing an indicated message corresponding to a result of checking a source program according to prescribed check items;

a processor grouping the indicated message based on a meaning thereof and determining an output status of the indicated message based on the grouping thereof; and an editing unit to edit the indicated message for output based on the grouping, where the editing comprises outputting an error list comprising a list of messages, and where said editing determines whether the indicated message is to be displayed when the error list is displayed based on the grouping.

8. A device according to claim 7, wherein said processor groups a plurality of indicated messages including the indicated message.

9. A device according to claim 7, wherein said processor comprises a checking section checking the source program based on prescribed check items and generating a check result based on results of the checking, the indicated message being generated based on the check result.

10. A device according to claim 7, wherein said processor comprises a syntax analysis section generating a syntax text for the source program, the indicated message being generated responsive to a result of checking the source program according to prescribed check items using the syntax text.

11. A device according to claim 7, wherein said processor comprises an editing section determining a group for the indicated message based on the meaning of the indicated message and group information indicating an output status for each of plural meanings of indicated messages.

12. A device according to claim 7, wherein said processor comprises an editing section determining a group for the indicated message based on the meaning of the indicated message and group information indicating an output status for each of plural meanings of indicated messages.

13. A device according to claim 7, wherein said processor comprises an indicated message preparing section generating the indicated message based on a result of checking the source program according to prescribed check items.

14. A device according to claim 7, wherein said processor comprises an indicated message urgency processing section determining an urgency of the indicated message based on the meaning of the indicated message and history information for previous indicated messages of the same meaning.

15. A device according to claim 7, wherein said processor comprises an output message editing section selecting the indicated message for output when the output status indicates that the indicated message is to be output.

16. A device according to claim 15, wherein the output message editing section determines an output order for the indicated message based on an urgency thereof when the indicated message is selected for output.

17. A device according to claim 7, wherein said processor comprises a group setting section dividing indicated message meanings into groups based on an instruction from a user and determining an output status for each group, whereby the meaning of the indicated message indicates a group for the indicated message and the output status of the indicated message is the output status of the group.

18. A device, comprising:

a storage storing an indicated message corresponding to a result of checking a source program according to prescribed check items; and a processor grouping the indicated message based on a meaning thereof and determining an output status of the indicated message based on the grouping thereof, wherein said storage comprises an indicated message history storing section storing numbers of previous indicated messages by indicated message meaning and storing an accumulated value corresponding to each of the meanings, each accumulated value indicating a count of revisions made to the source program in response to previous indicated messages of the corresponding meaning.

19. A device, comprising:

a storage storing an indicated message corresponding to a result of checking a source program according to prescribed check items; and a processor determining an urgency of the indicated message based on a meaning thereof and determining a relative order for output of the indicated message based on the urgency; and an editing unit editing an error list comprising a list of messages from the checking result, and determining whether the indicated message is to be displayed with the error list based on information indicating which types of message meanings or groups thereof are to be displayed.

* * * * *